(12) United States Patent
Dasgupta et al.

(10) Patent No.: US 7,539,254 B2
(45) Date of Patent: May 26, 2009

(54) METHOD AND SYSTEM FOR OPTIMAL BITLOADING IN COMMUNICATION AND DATA COMPRESSION SYSTEMS

(75) Inventors: Soura Dasgupta, Coralville, IA (US); Manish Vemulapalli, Iowa City, IA (US); Ashish Pandharipande, Suwon (KR)

(73) Assignee: University of Iowa Research Foundation, Iowa City, IA (US)

( * ) Notice: Subject to any disclaimer, the term of this patent is extended or adjusted under 35 U.S.C. 154(b) by 709 days.

(21) Appl. No.: 11/127,529

(22) Filed: May 11, 2005

(65) Prior Publication Data

US 2006/0291576 A1    Dec. 28, 2006

Related U.S. Application Data

(60) Provisional application No. 60/570,121, filed on May 11, 2004.

(51) Int. Cl.
*H04L 27/28* (2006.01)
*H04L 12/26* (2006.01)

(52) U.S. Cl. ........................ 375/260; 370/232
(58) Field of Classification Search ............. 375/260, 375/225, 240, 222; 370/232, 468
See application file for complete search history.

(56) References Cited

U.S. PATENT DOCUMENTS

| | | | |
|---|---|---|---|
| 4,679,227 A | 7/1987 | Hughes-Hartogs | |
| 4,731,816 A | 3/1988 | Hughes-Hartogs | |
| 4,833,706 A | 5/1989 | Hughes-Hartogs | |
| 5,539,777 A | 7/1996 | Grube et al. | |
| 6,084,917 A * | 7/2000 | Kao et al. | 375/260 |
| 6,865,232 B1 * | 3/2005 | Isaksson et al. | 375/26 |
| 2003/0095591 A1 * | 5/2003 | Rekai et al. | 375/225 |
| 2004/0001552 A1 | 1/2004 | Koifman | |
| 2004/0057528 A1 | 3/2004 | Tzannes | |

OTHER PUBLICATIONS

International Search Report.
S. Akkarakaran and P.P. Vaidyanathan, "Discrete Multitone Communication With Principal Component Filter Banks," *IEEE International Conference on Communications*, pp. 901-905, 2001.
A.N. Barreto and S. Furrer, "Adaptive Bit Loading for Wireless OFDM Systems," *IEEE International Symposium on Personal, Indoor and Mobile Radio Communications*, pp. 88-92, 2001.
J. Campello, "Practical Bit Loading for DMT," *IEEE International Conference on Communications*, pp. 801-805, 1999.
P.S. Chow, J.M. Cioffi and J.A.C. Bingham, "A Practical Discrete Multitone Transceiver Loading Algorithm for Data Transmission Over Spectrally Shaped Channels," *IEEE Transactions on Communications*, pp. 773-775, 1995.

(Continued)

*Primary Examiner*—Khai Tran
(74) *Attorney, Agent, or Firm*—Ballard Spahr Andrews & Ingersoll, LLP

(57) ABSTRACT

This invention provides a method and system for determining the number of bits to assign to a frequency range in a signal. The present invention is capable of bit allocation, with B total bits, among a plurality of N frequency ranges in time a time O(N log N), which is independent of the size of B. Embodiments of the present invention have many practical applications, including allocating bits among sub-channels in a multi-carrier communication system, and allocating bits among sub-bands in a signal representing digital multimedia, such as in JPEG or MPEG compressed files.

20 Claims, 12 Drawing Sheets

OTHER PUBLICATIONS

R.F.H. Fischer and J.B. Huber, "A New Loading Algorithm for Discrete Multitone Transmission," *IEEE Global Telecommunications Conference*, pp. 724-728, 1996.

Z. Galil and N. Megiddo, "A Fast Selection Algorithm and the Problem of Optimum Distribution of Effort," *Journal of the ACM*, pp. 58-64, vol. 41, 1979.

N. Katoh, T. Ibaraki and H. Mine, "A Polynomial Time Algorithm for the Resource Allocation Problem with a Convex Objective Function," *Journal of Operational Reseach Society*, pp. 449-455, vol. 30, 1979.

B.S. Krongold, K. Ramchandran and D. L. Jones, "An Efficient Algorithm for Optimal Margin Maximization in Multicarrier Communication Systems," *IEEE Global Telecommunications Conference*, pp. 899-903, 1999.

Y.-P. Lin and S.-M. Phoong, "Perfect Discrete Multitone Modulation With Optimal Transceivers," *IEEE Transactions on Signal Processing*, pp. 1702-1711, Jun. 2000.

A. Pandharipande and S. Dasgupta, "Optimal Transceivers For DMT Based Multiuser Communication," *IEEE International Conference on Acoustics, Speech, and Signal Processing*, pp. 2369-2372, 2001.

*IEEE Transactions on Communications*, Dec. 2003.

T. Ibaraki and N.Katoh, "*Resource Allocation Problems: Algorithmic Approaches*," MIT Press, Cambridge, Massachusetts, 1988.

\* cited by examiner

METHOD AND SYSTEM FOR OPTIMAL BITLOADING IN COMMUNICATION AND DATA COMPRESSION SYSTEMS

CROSS REFERENCE TO RELATED PATENT APPLICATION

This application claims priority to U.S. Provisional Application No. 60/570,121, filed May 11, 2004, and which is herein incorporated by reference in its entirety under 35 U.S.C. § 120.

BACKGROUND OF THE INVENTION

The rapid growth in recent years of wired and wireless communications has strained traditional forms of modulated transmission. For traditional single-carrier modulation systems to scale with the need for high data rate communications, increasingly costly and complex equalizers have been employed. To solve the problem of increasingly expensive equalizers, multi-carrier (MC) communication systems have been developed. MC communication systems work by dividing a transmission bandwidth into a plurality of smaller sub-channels, with a fixed total number of transmission bits, where the bandwidth of each channel is chosen narrow enough in frequency such that the sub-channels exhibit nearly ideal frequency response characteristics. An essential problem in MC communication systems is optimally allocating a fixed number of transmission bits over several frequency ranges or sub-channels so that the most efficient signal transmission is achieved.

A parallel problem exists in the area of digital multimedia compression, where there is an increasing need for large multimedia files to be compressed for convenience, storage, and transmission. Multimedia files often contain digital representations of signals such as sound and video. All such signals can be expressed in terms of signal frequencies such as color in video. In analogy to MC communication systems, one class of compression schemes, known as sub-band coding, decomposes the signal to be compressed into several frequency ranges or bands, known as sub-bands, and compress each sub-band separately according to its relative importance in the overall signal representation. A compression scheme such as JPEG or MPEG must then choose how to best allocate a fixed number of bits over various sub-bands so that the resulting image is the best possible reproduction of the original. Choosing exactly how to allocate bits among various sub-frequencies is thus an essential component of sub-band coding.

As discussed above and as known in the art, both MC communications and sub-band coding require a solution to the analogous problem of intelligently distributing a fixed number of bits among a set of frequency ranges in an input signal. Thus, the principles, problems, and analysis of bit loading in MC communications are equally applicable to sub-band coding, and vice versa. To provide the proper context for understanding bit loading in the art, forms of MC communications and sub-band coding are discussed below.

In MC communication systems as known in the art, we have k=w/Δf sub-channels, allowing information symbols to be transmitted simultaneously in k sub-channels. This type of data transmission system is known as frequency-division multiplexing (FDM). A carrier is associated with each sub-channel, such that:

$x_k(t) = \sin 2\pi f_k t$ for $k=0,1,2,\ldots k-1$.

For each k sub-channel, $f_k$ represents the mid-frequency. The symbol rate can be set to 1/T on each of the sub-channels to equal the separation Δf of the adjacent sub-channels, making the sub-channels orthogonal over the symbol interval T, such that:

$f_j - f_i = n/T$ for $n=1,2,3,\ldots$

Therefore, the phases between the channels are independent, creating what is known in the art as orthogonal frequency division multiplexing (OFDM). In an OFDM system, the modulator can be implemented by a parallel bank of filters executing the Inverse Discrete Fourier Transform (IDFT) transformation of N data streams, where each data stream corresponds to one sub-channel. Likewise, the demodulator can be implemented by a parallel bank of filters executing the Discrete Fourier Transform (DFT) transformation. Modulation and demodulation can also be carried out in software operative on a microprocessor such as an Intel compatible x-86 microprocessor.

FIG. 1 depicts the first step in the serial to parallel signal conversion process, where a serial data stream s(n) is input and divided into N parallel data streams $z_i(n)$.

FIG. 2 depicts an equivalent model of a Discrete Multi-Tone (DMT) communication system, known in the art as a baseband model. DMT is a general framework for MC systems of which OFDM is a special case. In OFDM, an N-point block Inverse Discrete Fourier Transform (IDFT) transformation of these streams of data is followed by a parallel to serial conversion, then transmission after adding cyclic prefix redundancy data. At channel output the system performs in reverse-step the operations of redundancy removal, serial to parallel conversion, and the application of a block Discrete Fourier Transform (DFT) transformation to arrive at a representation of the original input data. More general DMT systems involve more general transforms replacing the DFT and IDFT transform blocks, and more schemes of redundancy insertion and removal may be used.

While an MC communication system, either in its specific form of OFDM or in a more general DMT framework, can obviate the need for an expensive equalizer, it creates bit allocation problems such as determining the optimal bit distribution given variable transmission conditions, power allocation among sub-channels, total transmission power, and the Peak-to-Average (PAR) power ratio among sub-channels.

An example sub-band coder is illustrated FIG. 3. In FIG. 3, each $Q_k$ is a $b_k$ bit quantizer. The arrangement preceding these quantizers is known in the art as the analysis block, which decomposes the signal to be compressed, $Z_k$, into the sub-band signals at the input of the quantizers. The block following the quantizers is known as the synthesis block, which reconstructs the signal $Z_k$. The goal in sub-band coding is to assign bits $b_k$ to minimize the overall distortion in the reconstructed signal. The overall error in reconstructing $Z_k$ is as in (1, 3), with:

$\Phi_k(b_k) = \sigma^2_k 2^{-2b_k}$.

Here $\sigma^{2k}$ is the variance of the k-th sub-band signal ($v_k$), determined by the statistics of Z and the filters $H_k$. This is captured by the minimization in (1, 2) under (3).

The problem of bit allocation among a plurality of frequency ranges is known as bit loading in the art. Specifically, for an N sub-channel system, where $b_k$ is the number of bits assigned to each symbol in the cognizant sub-channel, the problems of minimizing the transmission power in MC communications or minimizing the distortion in sub-band coding are special cases of the general problem of finding $b_k$ to:

$$\text{Minimize: } P(b_1, \ldots, b_N) = \sum_{k=1}^{N} \Phi k(b_k) \quad (1)$$

$$\text{Subject to: } \sum_{k=1}^{N} bk = B, b_k \in \{0, 1, \ldots, B\}. \quad (2)$$

where $\Phi_k$ is a convex function, and B is a positive integer representing the total number of bits to be distributed among N frequency ranges, such as N sub-channels or sub-bands. In sub-band coding:

$$\Phi_k(b_k) = \alpha_k 2^{-b_k}, \alpha_k > 0; \quad (3)$$

where $\alpha_k$ is determined by the signal variance in the k-th sub-band, $P(b_1, \ldots, b_N)$ is the average distortion variance, and $b_k$ is the bits assigned to the k-th sub-band. Further, $\alpha_k$ increases with increasing signal variance. In MC systems:

$$\Phi_k(b_k) = \alpha_k 2^{b_k}, \alpha_k > 0; \quad (4)$$

where $\alpha_k$ reflects target performance, channel and interference conditions experienced in the k-th sub-channel, the modulation scheme used, and where $\Phi_k(b_k)$ is the transmission power in the k-th sub-channel, and $P(b_1, \ldots, b_N)$ is the total transmitted power. Higher values of $\alpha_k$ reflect more adverse sub-channel conditions and/or stringent performance goals.

It is recognized that for general convex functions $\Phi_k$, the above constrained minimization grows in complexity with the size of B. Since B can be large, it is important to formulate algorithms for which the complexity bound is independent of B. Accordingly, what is needed is an algorithm whose complexity is independent of B, when $\Phi$ is as in (5), below. Observe this captures both (3) ($\eta = -2$; a=2) and (4) ($\eta = 1$; a=2):

$$\Phi_k(b_k) = \alpha_k a^{\eta b_k}, \alpha_k, a > 0. \quad (5)$$

As an example, in a MC communication system, $e_k$ denotes the signal power in the k-th sub-channel, and is given by:

$$e_k = \alpha_k 2^{b_k} - \alpha_k.$$

Here, $\alpha_k$ represents the target channel performance given the channel and interference conditions experienced in the k-th sub-channel:

$$\alpha_k = 2 \frac{\Gamma_k \sigma_k^2}{G_2^k}.$$

Depending on the modulation scheme employed, and the precise DMT scheme used (which may be different from OFDM), $e_k$ may take a slightly different form, but the optimization problem in (1, 2), under (5), still captures the power minimization problem in all MC schemes.

Several bit loading algorithms exist in the art which attempt to efficiently allocate B bits among N sub-channels. However, these methods provide solutions which grow with the size of B or restrict the size of B, providing algorithm run times which are too long to be practical when the number of bits B is large, or unrealistically restrict the size of B.

J. Campello, "Practical bit loading for DMT", *IEEE International Conference on Communications*, pp 801-805, 1999, provides a prior art algorithm for allocating B bits among N sub-channels. Campello's algorithm restricts the maximum number of bits to be assigned to any sub-channel to some B* and thereby provides a bit allocation algorithm with a run time of O(N). The assumption of small B* is problematic in sub-band coding, and even in MC communications settings when certain sub-channels experience deep fades. In such a case, efficiency may demand that a large number bits be assigned to sub-channels with more favorable conditions. Another contributor to the complexity of Campello's algorithm is the dynamic range of as $\alpha_i$, which comes into play in the presence of deep fades.

B. S. Krongold, K. Ramchandran and D. L. Jones, "An efficient algorithm for optimal margin maximization in multicarrier communication systems", IEEE Global Telecommunications Conference, pp 899-903, 1999, provides a prior art bit loading algorithm whose complexity grows with O(N log N), and linearly with B. Thus, as the total number of bits B becomes large, the Krongold, Ramchandran bit loading algorithm becomes impractical, especially when bits must be allocated to sub-channels in real-time.

Thus, prior art systems provide bit loading algorithms that either grow with the size of B, making the algorithm run time too large to be computationally efficacious, or only provide solutions when the number of total bits is restricted to an unrealistically small number B*. Therefore, what is needed is a solution to the bit loading problem illustrated by (1, 2), and (5) whose complexity has an upper bound that is determined only by N, and where the role of B is only to induce cyclic fluctuations in the precise number of computations, and neither B nor the dynamic range of $\alpha_k$, affects the upper bound of the runtime.

SUMMARY OF THE INVENTION

The system and method of the present invention provides a bit loading algorithm for use in various applications, including MC communication systems and sub-band signal coding where the optimal number of bits to allocate among N channels or sub-bands can be determined in O(N log N) time, independently of the total number of bits B to be distributed. The present invention thus solves (1), (2) for arbitrary convex $\Phi_k$, which is specialized to the case of (5). Denote for k=1, . . . , N, x=1, . . . , B $$\delta_k(x) = \Phi_k(x) - \Phi_k(x-1). \quad (6)$$

The $\Phi_k$'s being convex, it follows that:

$$\delta_k(1) < \delta_k(2) < \ldots < \delta_k(B), \forall k. \quad (7)$$

Let S denote the set of smallest B elements of:

$$\tau = \{\delta_k(x) : k=1, \ldots, N, x-1, \ldots, B\}.$$

The following lemma gives an optimum solution to (1), (2). Lemma 1. The optimal solution $b^* = [b_1^*, \ldots, b_N^*]^T$ to problem (1), (2), is defined as follows:

$$b_k^* = \begin{cases} 0 : \delta_k(1) \notin S \\ B : \delta_k(B) \in S \\ y : \delta_k(y) \in S \& \delta_k(y+1) \notin S \end{cases}.$$

This lemma provides a conceptual framework for solving (1), (2). Specifically, construct S, and for each k, determine the largest integer argument $b_k$ for which $\delta_k(b_k)$ is in S. For general convex functions $\Phi_k$ the complexity of prior art solutions grows with B. In contrast, the system and method of the present invention provides an algorithm for convex functions of the type (5) whose complexity does not depend on the total number of bits to be allocated. To describe the optimal bit loading algorithm of the present invention, several variables, notations, and definitions are used, which are provided herein for illustrative purposes only, and which in no way limit or define the scope of the present invention. To begin describing the algorithm of the present invention, we define:

$$\beta = a^n > 0. \quad (8)$$

To avoid trivialities, we assume that:

$$\beta \neq 1. \quad (9)$$

For (3) $0 < \beta < 1$, while for (4), $\beta > 1$.

In the case of (5), one finds that:

$$\delta_k(x) = \alpha_k \beta^{(x-1)}(\beta - 1). \quad (10)$$

To facilitate further understanding of the present invention, the following property of logarithms is provided for when the base is less than one.

Lemma 2. Suppose $0 < \beta < 1$, and for some x, y:

$$\log_\beta(x) < y$$
$$\text{Then}$$
$$x > \beta^y.$$

We note that $\delta_k(x) < 0$ when $0 < \beta < 1$. Since we must eventually work with an ordering of $\delta_i$, the first step of the algorithm requires ordering $\alpha_i$, and can be accomplished in $O(N \log N)$ steps. Hence, it can be assumed without sacrificing generality that:

$$\alpha_1 \leq \alpha_2 \leq \ldots \leq \alpha_N \text{ if } \beta > 1,$$

$$\alpha_1 \geq \alpha_2 \geq \ldots \geq \alpha_N \text{ if } \beta < 1. \quad (11)$$

This ensures the following self evident fact stated without proof.

Lemma 3. Consider (10) with (11) in force. Then for all non-negative $\beta$, x:

$$\delta_k(x) \leq \delta_k(x+1),$$

And $$\delta_{k+1}(x) \geq \delta_k(x).$$

Define the sequence:

$$l_i = \lceil \log \beta(\alpha_i/\alpha_1) \rceil, i = 1, 2, \ldots, N. \quad (12)$$

with $l_{N+1} = \infty$, where $\lceil \alpha \rceil$ is the smallest integer greater than or equal to $\alpha$. Because of Lemma 2 and (11):

$$l_i \leq l_{i+1}.$$

The significance of the integers $l_i$ is explained further by Lemma 4.

Lemma 4. With $l_i$ defined in (12), and n any integer:

$$\delta_1(l_i + n) < \delta_i(1+n) \leq \delta_1(l_i + 1 + n).$$

From (12) and the definition of the ceiling function, we have the following result:

$$l_i - 1 < \log_\beta(\alpha_i/\alpha_1) \leq l_i.$$

Now for $\beta > 1$, the result directly follows from the above equation. When $\beta < 1$, we have, because of Lemma 2, the following:

$$\alpha_1 \beta^{l_i - 1 + n} > \alpha_i \beta^n \geq \alpha_1 \beta^{l_i + n}. \quad (13)$$

Multiplying throughout by $(\beta - 1)$ we obtain the result (observe that $\beta - 1 < 0$). The algorithm of the present invention solves (1), (2), under (5), assuming that the ordering implicit in (11) has already occurred, and assigns $b_i$ bits to the i-th sub-channel. Now that the above referenced conditions are established, the optimal bit loading algorithm of one embodiment of the present invention proceeds according to the steps below. Step-1: Find the smallest k such that:

$$R_k = \Sigma_{i=1}^{k-1}(l_k - l_i) \geq B. \quad (14)$$

Then:

$$b_i 0 \forall i \in \{k, k+1, \ldots, N\}. \quad (15)$$

Step-2: Find:

$$\Delta = B - R_{k-1} \quad (16)$$

$$r = \Delta \bmod (k-1) \quad (17)$$

$$q = \Delta \operatorname{div}(k-1). \quad (18)$$

Step-3: Find the r smallest elements of the set:

$$\{\delta_1(l_{k-1} - l_1), \delta_2(l_{k-1} - l_2), \ldots, \delta_{k-1}(0)\}. \quad (19)$$

In particular, with $l_{ji}$ such that with $l_{ji} \in \{1, 2, \ldots, k-1\}$, $$\delta_{ji}(l_{k-1} - l_{ji}) \leq \delta_{ji+1}(l_{k-1} - l_{ji+1}), \quad (20)$$

call:

$$J = \{j_1, j_2, \ldots, j_r\}. \quad (21)$$

If $r = 0$, J is empty.

Step-4: For all $i \in \{1, 2, \ldots, k-1\}$, $$b_i = \begin{cases} l_{k-1} - l_i + q + 1, & \text{when}, i \in J \\ l_{k-1} - l_i + q, & \text{else} \end{cases}. \quad (22)$$

Those skilled in the art of the present invention can observe that the complexity implicit in achieving (11) is $O(N \log N)$. Determination of k so that (14) holds requires at most 2N operations, regardless of B. Indeed one has, with:

$$\rho_1 = 0$$

$$\rho_n = \rho_{n-1} l_n,$$

$$R_n = (n-1) l_n - \rho_{n-1}.$$

Thus, the only impact that B has in the complexity of determining k is that for sufficiently small B, $k < N$, and the number of computations is further reduced to $2(k-1)$. Determining the ranking manifest in (20) is determined only by r and k, and is $O(r \log(k-1)) \leq O((N-1)\log(N-1))$. Determination of r requires 2 operations, independent of B. B does affect the precise value of r, which however is no greater than $N-1$. Thus, the overall complexity of the present invention is bounded by $O(N \log N)$, with B playing no role in the determination of this bound. The only effect that B has on the overall complexity is to cause fluctuations in the precise number of operations, within a range that is independent of B. These fluctuations occur in two circumstances. First, for small B, $k < N$, and finding k requires only $2(k-1)$ operations. Second, as B changes, r fluctuates between 0 and $N-1$, and the number of operations required to determine the smallest r elements of the set in (19) changes.

The correctness of the optimal bit loading algorithm of the present invention is now provided. Specifically, we now show that the algorithm of the present invention does indeed solve (1), (2), under (4). In view of Lemma 1, it suffices to show that the set:

$$S^* = \{\delta_1(1), \ldots, \delta_1(b_1); \delta_2(1), \ldots, \delta_2(b_2); \ldots; \delta_{k-1}(b_{k-1})\} \quad (23)$$

is such that $S^* = S$. This in turn requires the demonstration of the following facts.

(A) $|S^*| = |S| = B$, where $|.|$ represents the cardinality of its argument.

(B) For all $i, j \in \{1; 2, \ldots, N\}$, $\delta_i(b_i+1) > \delta_j(b_j)$.

The first theorem proves (A).

Theorem 1. With $b_i$ defined in (14-22), $|S^*| = B$.

Proof: Since $b_i = 0$ for all $i \in \{k, k+1, \ldots, N\}$, we need to show that:

$$\Sigma_{i=1}^{k-1} b_i = B.$$

From (14-22) we have that:

$$\sum_{i=1}^{k-1} b_i = \sum_{i \in j} b_i + \sum_{i \in \{\{1, \ldots k-1\} - J\}} b_i$$

$$= r(q+1) + (k-1-r)q + \sum_{i=1}^{k-1}(l_{k-1} - l_i)$$

$$= \Delta + R_{k-1}$$

$$= B.$$

To prove (B) we need an additional lemma, Lemma 5.

Lemma 5. With $l_i$, $k$, and $q$ as in (12-18):

$$q = \begin{cases} \leq l_k - l_{k-1}, & \text{if, } r = 0 \\ < l_k - l_{k-1}, & r \neq 0 \end{cases}.$$

Proof: From (14-18):

$$(k-1)q + r \leq R_k - R_{k-1} = \sum_{i=1}^{k}(l_k - l_i) - \sum_{i=1}^{k-1}(l_{k-1} - l_i)$$

$$= (k-1)(l_k - l_{k-1}).$$

Hence the result.

We now prove (B) for the case where $r = 0$.

Theorem 2. Consider (12-22), and suppose $r = 0$. Then (B) above holds.

Proof: For all $i \in \{2, \ldots, k-1\}$, from Lemma 4 and (22) we have:

$$\delta_i(b_i) \leq \delta_1(l_i + b_i) = \delta_1(l_{k-1} + q) = \delta_1(b_1), \quad (24)$$

as $l_1 = 0$. Thus, $\delta_1(b_1)$ is the largest member of $S^*$ in (23).

For the same reasons we also have for all $i \in \{1, \ldots, k-1\}$:

$$\delta_i(b_i+1) > \delta_1(l_i + b_i) = \delta_1(l_{k-1} + q) = \delta_r(b_1). \quad (25)$$

Further, as (15) holds, we have from Lemmas 3, 4 and 5 that for all $i \in \{k, k+1, \ldots, N\}$, $$\delta_1(b_1) < \delta_k(1 + b_1 - 1_k) \quad (26)$$

$$= \delta_k(1 + 1_{k-1} + q - 1_k)$$

$$\leq \delta_k(1)$$

$$\leq \delta_i(1).$$

In view of (24), (25) and (26), the result is proven.

Finally, we prove (B) for the case where $r \neq 0$.

Theorem 3. Consider (12-22), and suppose $r \neq 0$. Then (B) above holds.

Proof:

With the indices $j_i$ defined in (19)-(22), we first show that:

$$\delta_{j_r}(b_{j_r}) \geq \delta_i(b_i) \forall i \in \{1, \ldots, k-1\}. \quad (27)$$

In view of (19)-(22), this is clearly true for $i \in J$. Now consider $p \in \{\{1, \ldots, k-1\} - J\}$. As a result of (22) and Lemma 4:

$$\delta_p(b_p) \leq \delta_1(1_p + b_p)$$

$$= \delta_1(1_{k-1} + q)$$

$$< \delta_{j_r}(1_{k-1} + q - 1_{j_r} + 1)$$

$$= \delta_{j_r}(b_{j_r}).$$

For all $i \in \{\{1, \ldots, k-1\} - J\}$, (19)-(22), demonstrate that:

$$\delta_i(b_i+1) \geq \delta_{j_r}(b_{j_r}). \quad (28)$$

Further, from Lemmas 3 and 4, for all $i \in J$, $$\delta_i(b_i + 1) = \delta_i(1_{k-1} - 1_i + q + 2)$$

$$< \delta_1(1_{k-1} + q + 1)$$

$$\geq \delta_{j_r}(1_{k-1} + q + 1 - 1_{j_r})$$

$$= \delta_{j_r}(b_{j_r}).$$

Then, the result is proved by observing from Lemma 5 that for all $i \in \{k, k+1, \ldots, N\}$, $$\delta_{j_r}(b_{j_r}) \leq \delta_1(1_{j_r} + b_{j_r})$$

$$= \delta_1(1_{k-1} + q + 1)$$

$$< \delta_k(1_{k-1} + q + 2 - 1_k)$$

$$\leq \delta_k(1)$$

$$\leq \delta_i(1).$$

In conclusion, it has been proven above that the bit loading algorithm of the present invention can allocate B total bits among N frequency ranges in time O(N log N), independently of B. Those of skill in the art will appreciate that there exists alternate ways of proving the correctness of the present invention, and that the symbols, notations, and terminology used above to describe and prove the algorithm of the present invention are used for illustration purposes only and in no way limit or define the scope of the present invention.

BRIEF DESCRIPTION OF THE DRAWINGS

The accompanying drawings, which are incorporated in and constitute part of this specification, illustrate embodiments of the invention, and together with the description, serve to explain the principles of the invention. The embodiments described in the drawings and specification in no way limit or define the scope of the present invention.

DETAILED DESCRIPTION OF THE EMBODIMENTS

The method and system of the present invention are drawn to an optimal bit loading algorithm which can allocate bits among N frequency ranges, from among B total bits, in a time bounded by O(N log N), which is independent of B. Application of the present invention to sub-channels of a MC communication system, or to the sub-bands of a multimedia signal, each only represents one of many possible applications or embodiments of the present invention. Given the mathematical equivalence between sub-channel bit loading and sub-band bit loading, as particular embodiments of allocating bits among frequency ranges in the present invention, the principles, analysis, and steps of one embodiment can easily be applied by one skilled in the art to other embodiments.

The bit loading algorithm of the present invention is applicable to numerous practical applications, including assigning a number of bits to the sub-channels of a MC communication system, such as VDSL, ADSL, and DSL. Additionally, the algorithm of the present invention is applicable to sub-band coding, and so may be used for digital multimedia compression such as JPEG and MPEG encoding. Further uses and embodiments will be apparent to one of skill in the art.

Figure 1:
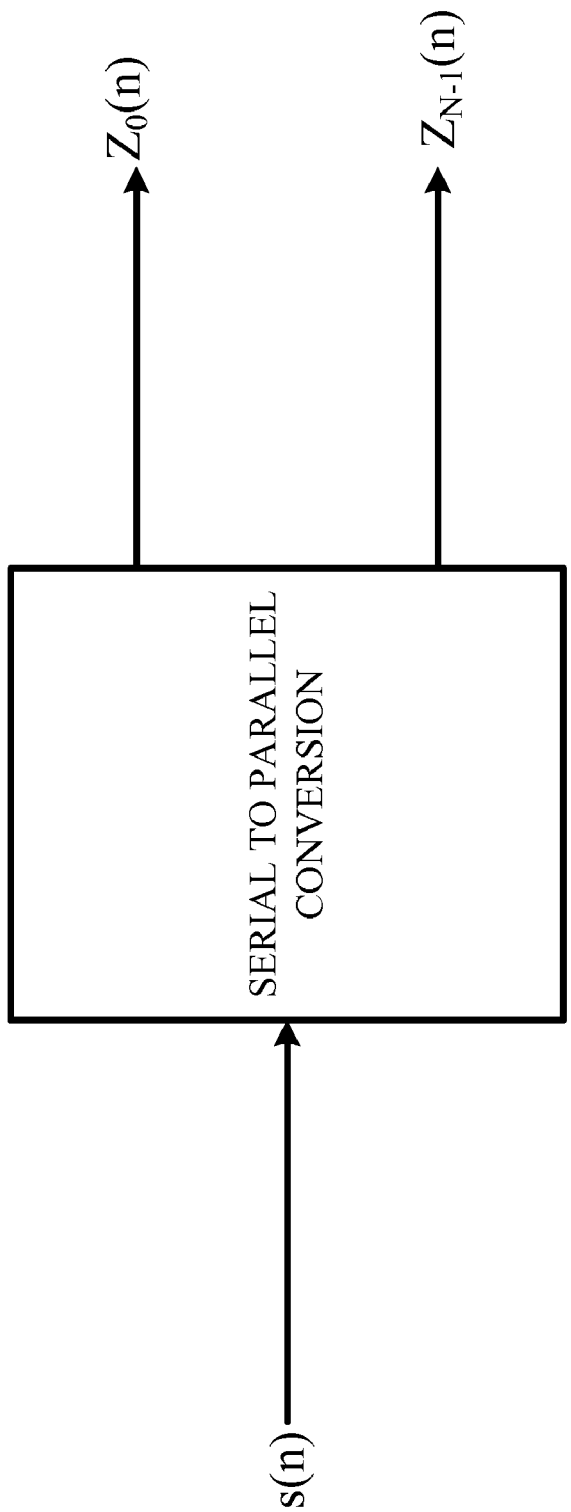
FIG. 1 illustrates serial to parallel signal conversion.
Figure 2:
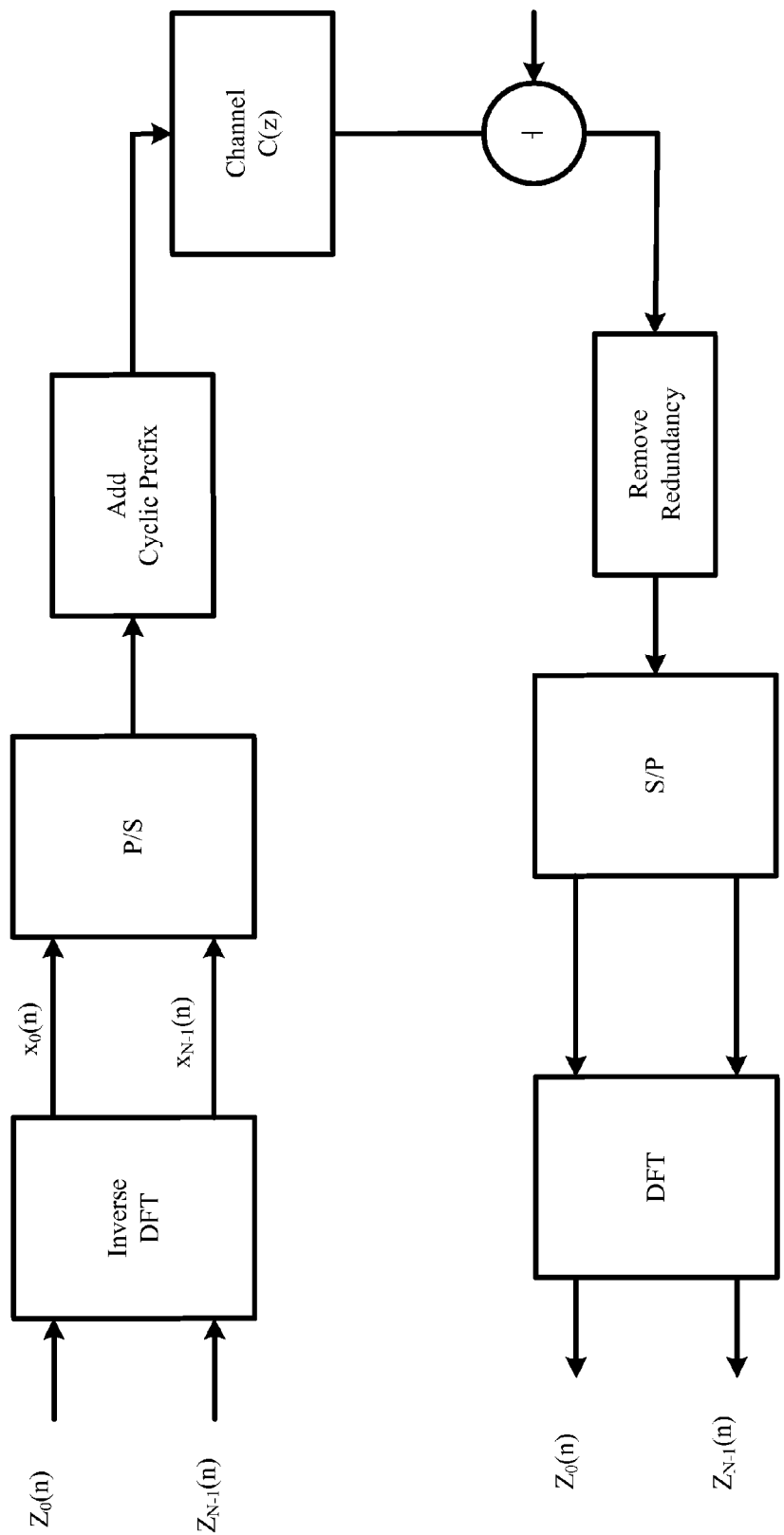
FIG. 2 shows an overview of an OFDM communication system.
Figure 3:
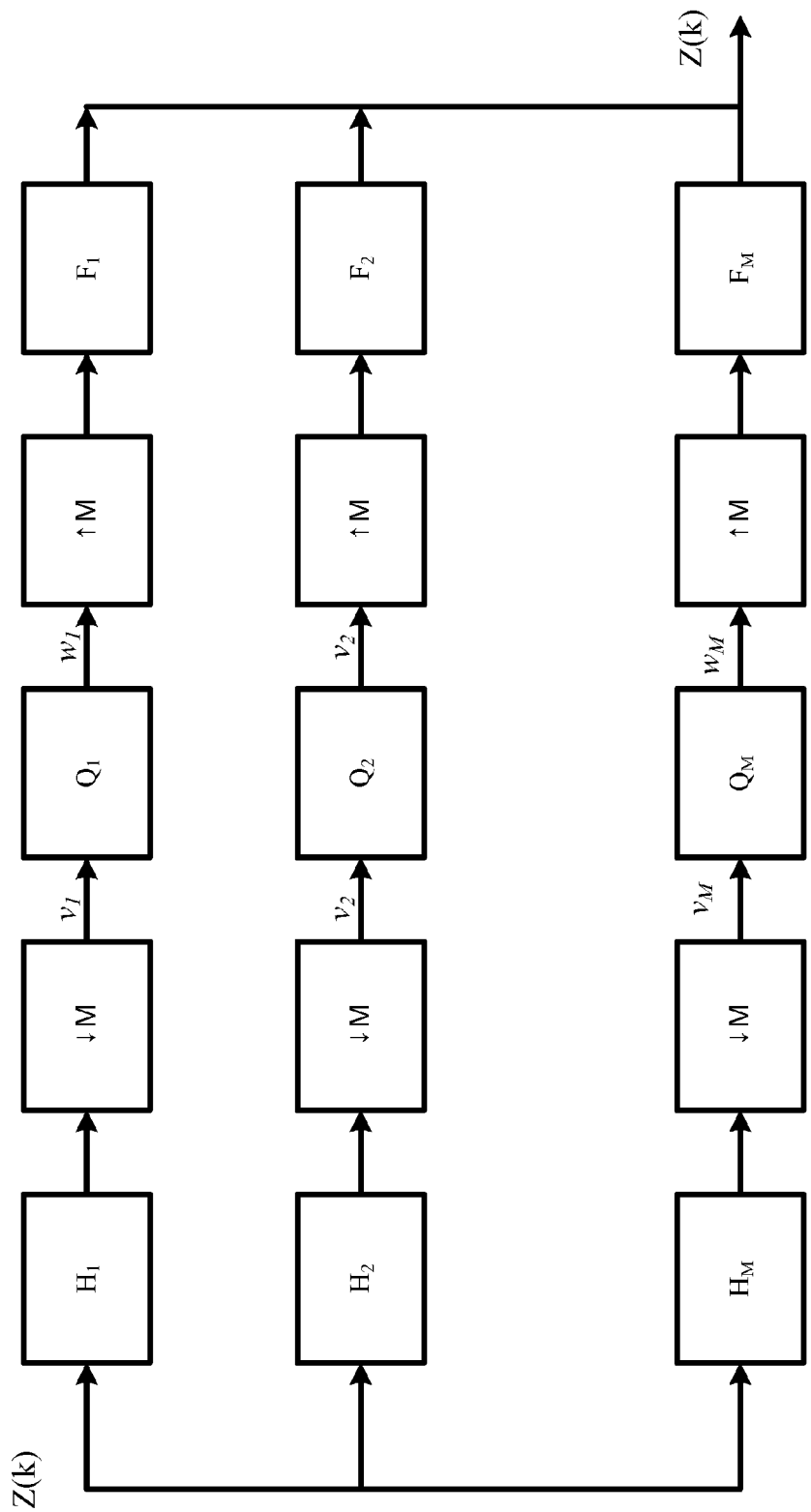
FIG. 3 illustrates a sub-band coder system.

The algorithm of the present invention can be carried out using numerous combinations of hardware and software. In one embodiment directed to MC communications using OFDM modulation, a parallel bank of logical units is used to parse an input stream s(n) of bits into a plurality of message streams $x_i(n)$, as depicted in FIG. 1 and FIG. 2. Another embodiment of the present invention is directed to sub-band coding, where the bit loading algorithm is carried out by a parallel bank of signal filters, as seen in FIG. 3.

The system and method of the present invention can also be carried out using a processor programmed to carry out the optimal bit loading algorithm of the present invention. One such programmed microprocessor includes a programmed computer, depicted in FIG. 12. A computer system, as known in the art, generally includes a bus 1201 for communicating data and instructions. The system also includes a memory 1207 in communication with the bus 1201 and used for storing data and instructions. The system also includes a processor 1202 in communication with the bus 1201, and used for executing programmed instructions such as those for executing the bit loading algorithm of the present invention. A storage device 1205 may also be connected to the bus 1201 and used to provide non-volatile storage of data and instructions. The computer system in one embodiment includes a personal computer (PC) containing program code which causes the processor 1202 to carry out the bit loading algorithm of the present invention.

Figure 12:
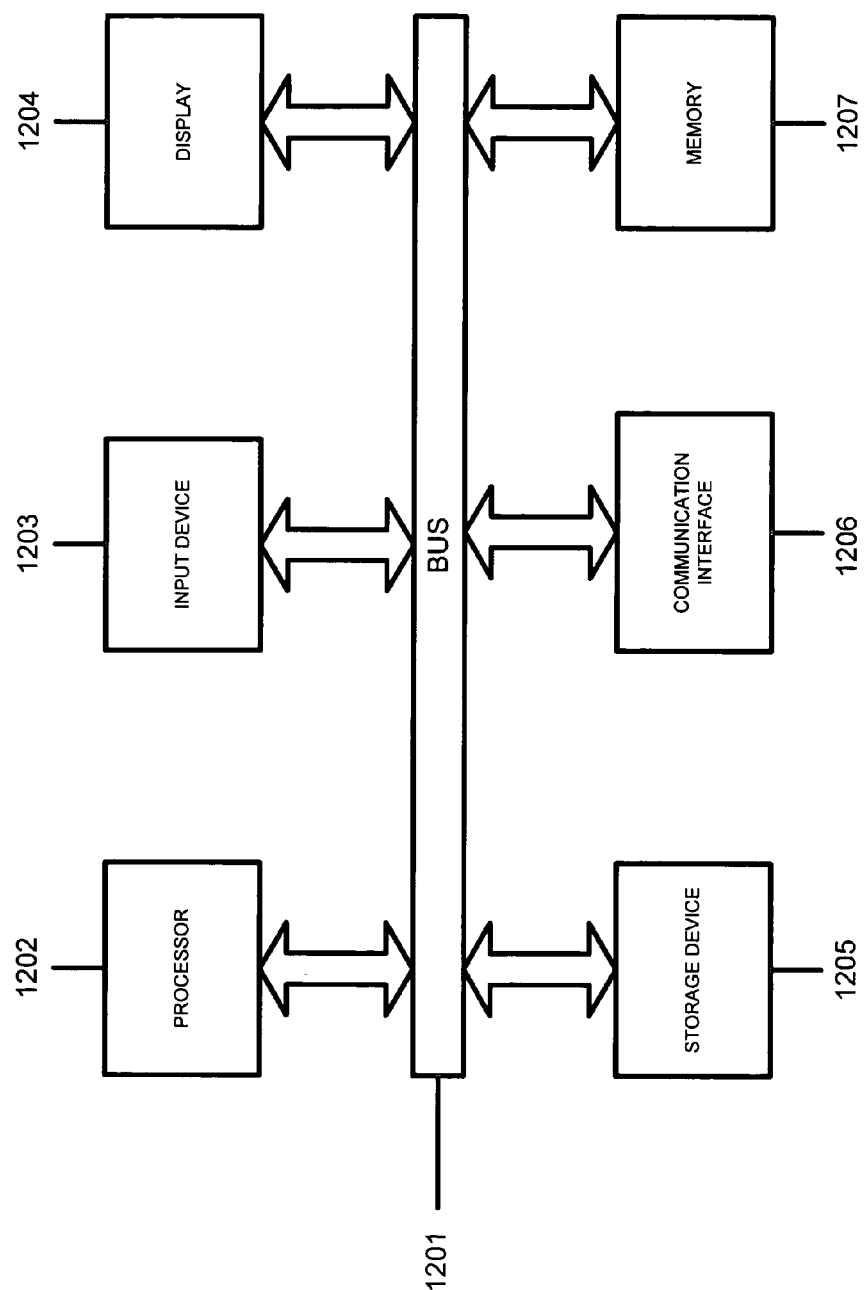
FIG. 12 illustrates the computer system of one embodiment of the present invention.

The processor 1202 in FIG. 12 can be an x-86 compatible processor, including a Pentium IV, manufactured by Intel Corporation, or an Athlon processor, manufactured by Advanced Micro Devices Corporation. Processors utilizing other instruction sets may also be used, including those manufactured by Apple, IBM, or NEC.

The input device 1203 in FIG. 12 could be an alphanumeric input device such as a keyboard, a position input device such as a mouse, or a video input device such as a digital camera, each connected to the bus 1201 of the computer system. The communication interface 1206 includes a wired or wireless network interface device. The display device 1204 of the system includes a cathode ray tube (CRT) computer monitor or a liquid crystal display (LCD).

It will be apparent to those skilled in the art that various devices may be used to carry out the system and method of the present invention, including cell phones, personal digital assistants, wireless communication devices, or dedicated hardware devices designed specifically to carry out the bit loading algorithm of the present invention.

This specification also includes, for certain steps, pseudo code which can be used by one of skill in the art to more easily implement the algorithm of the present invention. The variables, methods, functions, logic, and flow of the provided pseudo code are in no way meant to limit or define how the algorithm may be carried out in various embodiments.

Figure 4:
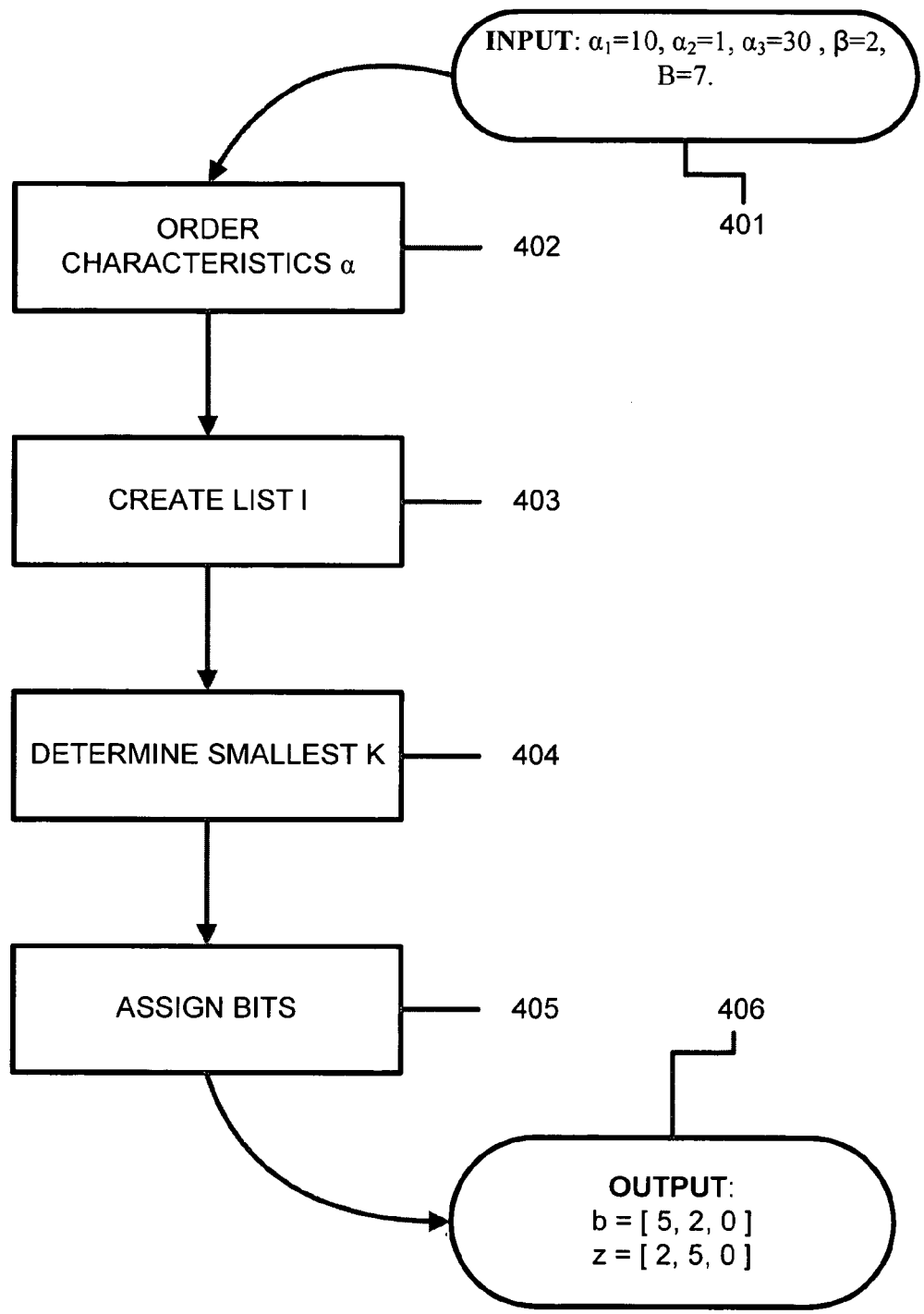
FIG. 4 illustrates an overview logical flow of one embodiment of the present invention.

A logical overview of one embodiment of the present invention is illustrated in FIG. 4. The algorithm of the present invention first receives illustrative input data 401 $\alpha_1=10$, $\alpha_2=1$, $\alpha_3=30$, $\beta=2$, and B=7. In this embodiment, $\alpha$ (or a) represents a frequency range, sub-channel, or sub-band characteristic, B the total number of bits to be distributed among N frequency ranges, and $\beta$ a variable for determining the particular application of the present algorithm to either sub-channel or sub-band bit loading, as defined in (11):

$$\alpha_1 \leq \alpha_2 \leq \ldots \leq \alpha_N \text{ if } \beta > 1,$$

$$\alpha_1 \geq \alpha_2 \geq \ldots \geq \alpha_N \text{ if } \beta < 1. \quad (11)$$

In this embodiment, $\beta<1$ indicates that the algorithm of the present invention is being used for sub-band bit loading, and $\beta>1$ indicates use for sub-channel bit loading. In the embodiment of FIG. 4, $\beta$ is 7 and so $\beta>1$, indicating that the algorithm of the present invention will be applied to sub-channel bit loading in FIG. 4.

Figure 5:
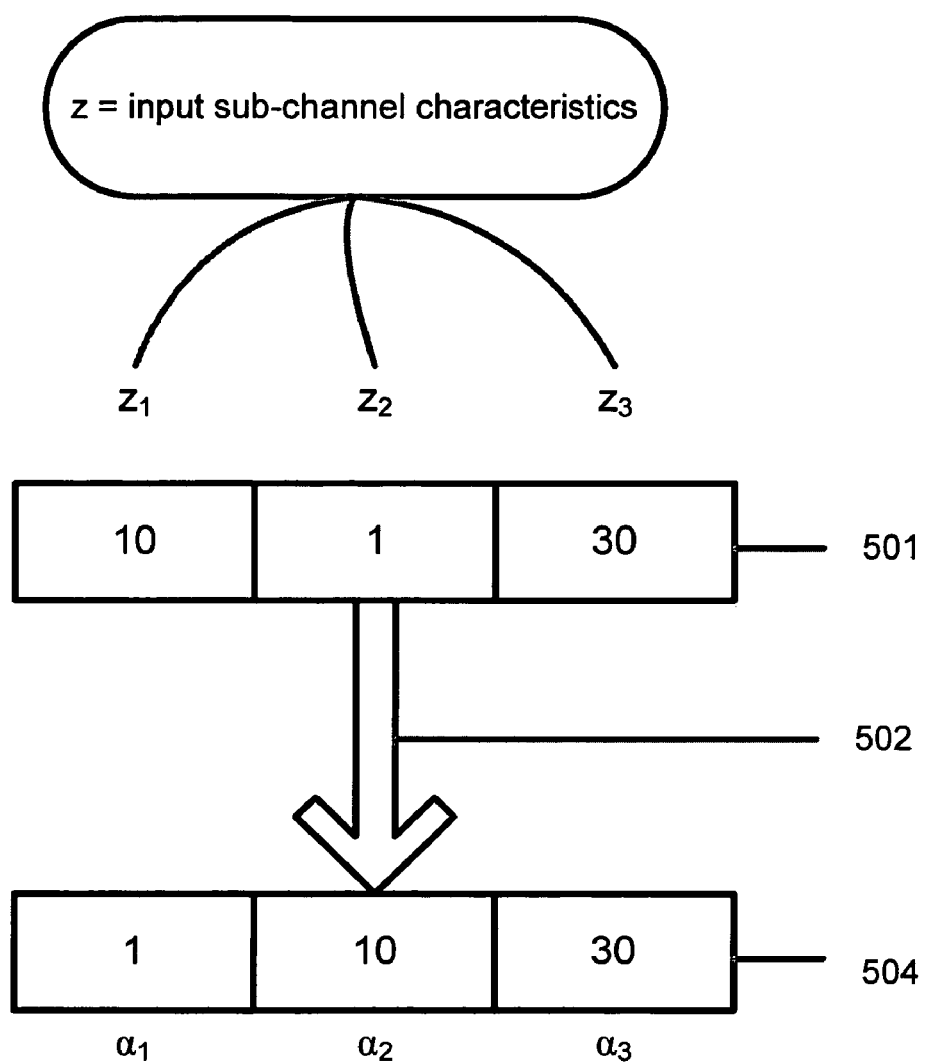
FIG. 5 illustrates an example of the ordering a first list step of one embodiment of the present invention.

The sub-channel characteristics are first placed in ascending order 402 according to (11), creating a first list of ordered sub-channel characteristics. This ordering is illustrated in FIG. 5 using the example input data 501, ordering 502 the input data 501 in ascending order, to produce an ordered list of sub-channel characteristics 503, shown here as:

$$\alpha=[1,10,30].$$

As known by one of skill in the art, ordering a list of numbers can be accomplished in time O(N log N). Additionally, a list Ind may be created to hold the indices of the elements ac in the input sequence. Using the example input data, Ind is described as:

$$Ind=[2,1,3].$$

Next, in this embodiment, a second list 1 403 is created as a function of the first list 402, where each entry in the second list $l_i$ corresponds to the sub-channel characteristic $\alpha_i$. This second list, or sequence, is defined by (12) as:

$$l_i=\lceil \log_\beta(\alpha_i/\alpha_1) \rceil, i=1,2,\ldots,N. \tag{12}$$

Figure 6:
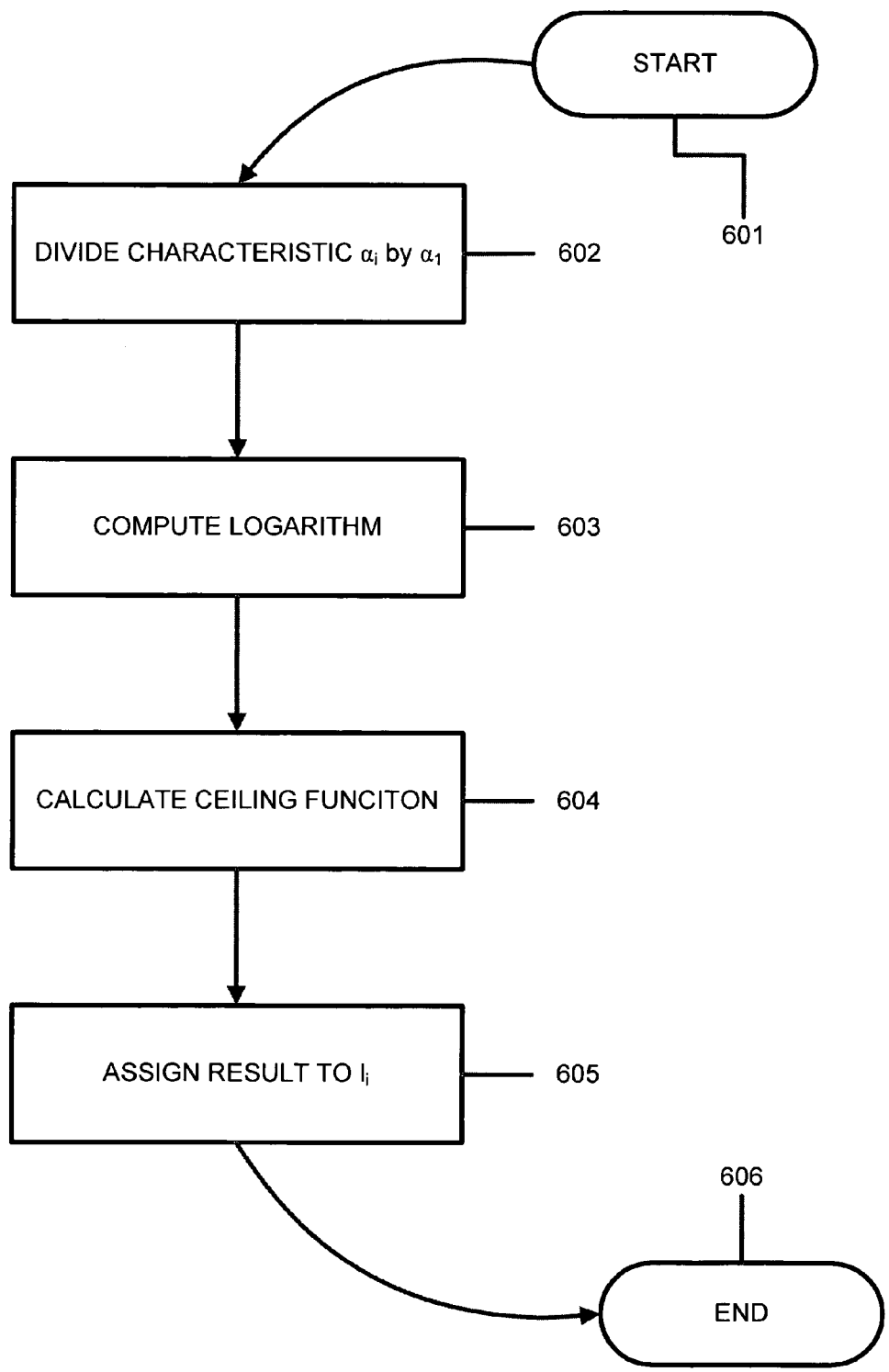
FIG. 6 illustrates in logical detail the step of creating the sequence 1 of one embodiment of the present invention.

The steps for creating the second list 1 are described in more detail in the embodiment of FIG. 6. The embodiment of FIG. 6 calculates an entry in the second list $l_i$, associated with sub-channel characteristic $\alpha_i$, as described in (12), as a function of entries in the first list by dividing $\alpha_i$ by $\alpha_1$ 602. Then, the logarithm base $\beta$ of the division is computed 603. Next, the ceiling of the computed logarithm is calculated 604, where calculating the ceiling of a value denotes the smallest integer value greater than or equal to the input value. Finally, the result of the ceiling function is assigned 605 to the entry $l_i$. For illustration purposes only, in the embodiment of FIG. 6, the following pseudo code describes how the list entry $l_i$ can be determined, where the variables used in the pseudo code correspond to the variables of the equations used to describe the algorithm of the present invention. One of skill in the art will recognize that there are various ways to compute the following result:

```
while i ≤ N
    l(i) = ceiling(log_β(α(i)/ α(1)));
    i = i + 1;
end
```

$$l(N+1)=B+1.$$

Returning now to FIG. 4, the third step in the embodiment of FIG. 4 involves determining a smallest value k 404, where k is defined in (11) as:

$$R_k=\sum_{i=1}^{k-1}(l_k-l_i)\geq B. \tag{11}$$

In other words, this step involves determining a smallest value k, such that the sum from 1 through k−1 of $(l_k-l_i)$ is greater than or equal to B. Determining the smallest k is illustrated in one embodiment of the present invention in FIG. 7. First, a list R is created 701. Then, the sum from i=1 to k of $(l_k-l_i)$ is calculated for each k 702, and the result stored in $R_k$. Finally, the smallest k is chosen 703 such that $R_k$ is greater than or equal to B.

Figure 7:
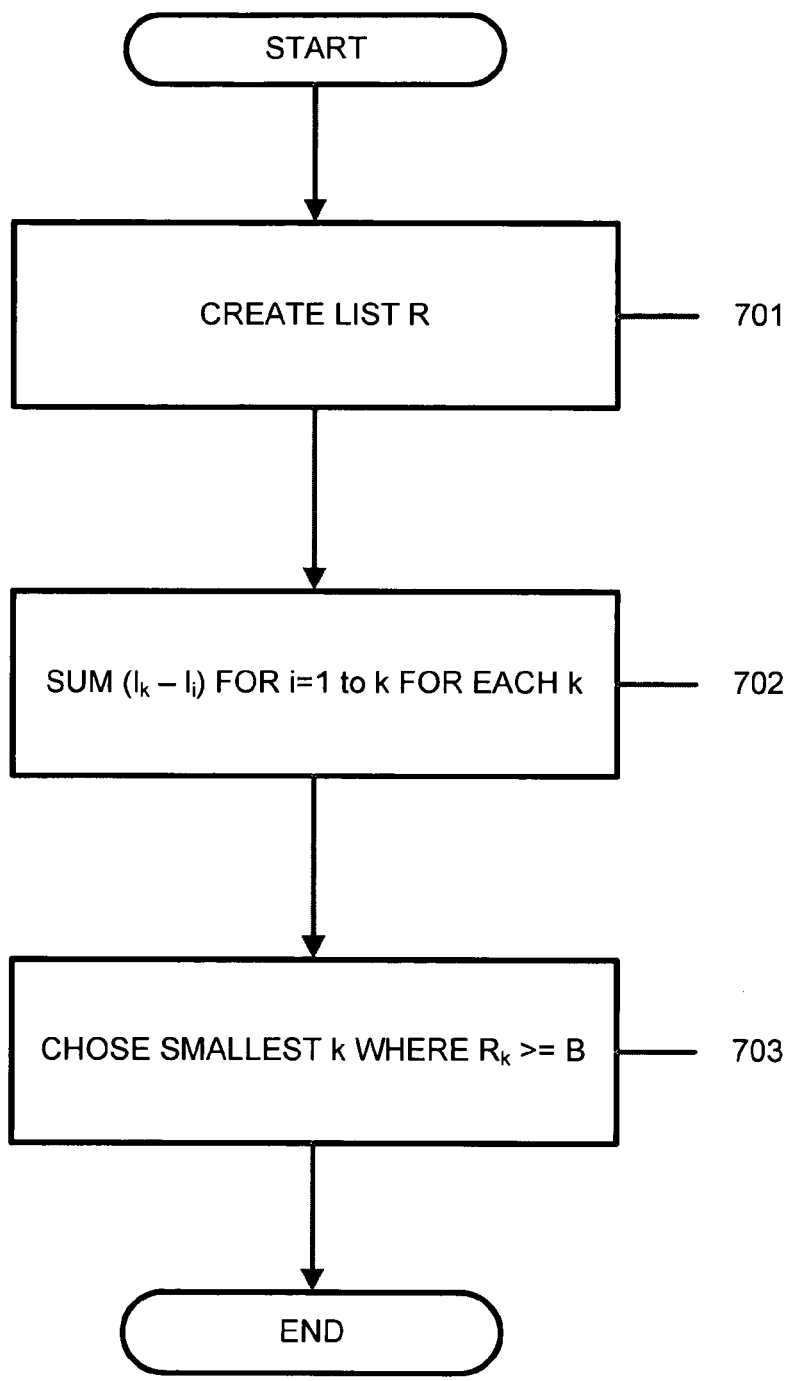
FIG. 7 illustrates in logical detail the determining the smallest k step of one embodiment of the present invention.

For illustration purposes only, in the embodiment of FIG. 7, where the smallest k according to the relationship in (11) is determined, the following pseudo code describes how k can be chosen:

```
k = 1; R(1)=0;
while k ≤ N & R(k)<B
    k = k+1;
    R(k) = R(k−1) + (k−1)*( l(k)−l(k−1));
end.
```

Figure 8:
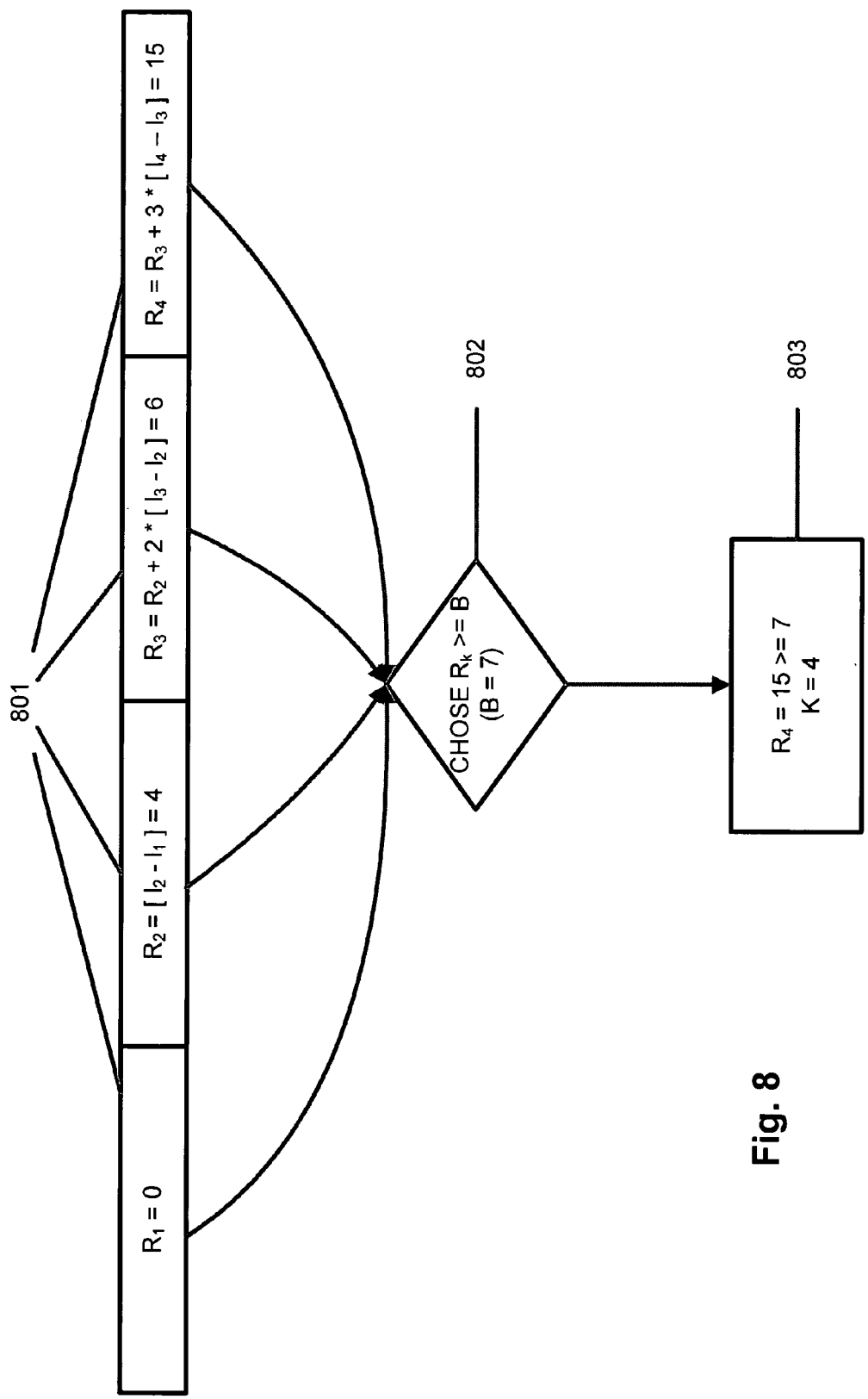
FIG. 8 illustrates an example of the determining the smallest k step of one embodiment of the present invention.

FIG. 8 illustrates one example of how k can be chosen as a function of the second list 1. Supplying the second list 1 to the embodiment of FIG. 8, and applying (11), we see that the values $R_k$ generated 801 are 0, 4, 6, and 15. Next, $R_k$ is chosen 802 such that $R_k$ is greater than or equal to B, which is 7 in the present embodiment. As a result, $R_4$, with a value of 15, is chosen 803 as 15 is the smallest value in the list R which is greater than or equal to 7. Thus, k is 4 in the embodiment of FIG. 8.

Once k is calculated, for example, as in the embodiment of FIG. 8, the number of bits $b_i$ assigned to each sub-channel with characteristic $\alpha_i$ can be determined for all i in k through N, which is stated in (15) as:

$$b_i=0 \forall i\in\{k,k+1,\ldots,N\}. \tag{15}$$

Figure 9:
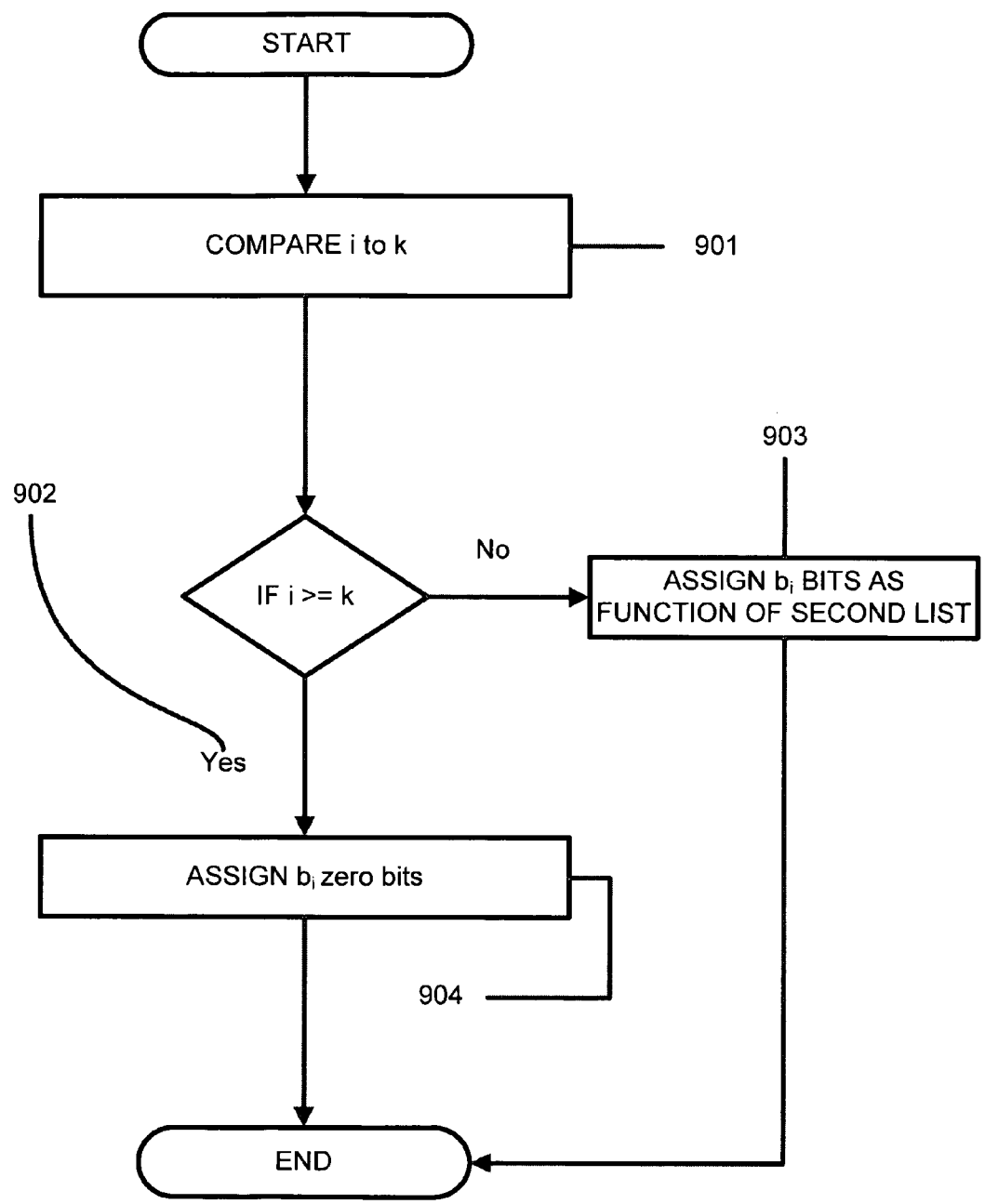
FIG. 9 illustrates in logical detail the assigning the number of bits step of one embodiment of the present invention.

Thus, for i in k through N, zero bits can be assigned in the algorithm of the present invention. This process is illustrated in the embodiment depicted in FIG. 9. First, for each index i, corresponding to sub-channel characteristic $\alpha_i$; and the number of assigned bits $b_i$, the value of i is compared 901 to the value of k determined as in FIG. 8. If i>=k 904, then $b_i$ is assigned zero bits. If, however, i<k, then $b_i$ will be assigned a number of bits as a function of the second list 1 903. Certain steps in the embodiment of FIG. 9 can be represented by the following pseudo code:

```
for (j=k; j ≤ N ;j++)
    b(j)=0;
end.
```

Next, in one embodiment of the present invention, three additional values are calculated, represented by equations (16), (17), and (18), from above:

$$\Delta=B-R_{k-1} \tag{16}$$

$$r=\Delta\bmod(k-1) \tag{17}$$

$$q=\Delta\operatorname{div}(k-1). \tag{18}$$

Using the example values of the prior embodiments, which are supplied for illustrative purposes only, the following values for Δ, r, and q are generated, where 'mod' means remainder, and 'div' means quotient:

$$\Delta=B-R_{k-1}=7-6=1$$

$$r=\Delta\bmod(k-1)=\Delta\bmod(4-1)=1$$

$$q=\Delta\operatorname{div}(k-1)=\Delta\operatorname{div}(4-1)=0.$$

The next step in one embodiment of the present invention involves determining the r smallest elements of the set described in (19):

$$\{\delta_1(l_{k-1}-l_1),\delta_2(l_{k-1}-l_2),\ldots,\delta_{k-1}(0)\}. \tag{19}$$

To determine the values for each $\delta_k$ in this set, $\delta_k$ is defined in (10) as:

$$\delta_k(x)=\alpha_k\beta^{(x-1)}(\beta-1). \tag{10}$$

In one embodiment of the present invention, $\delta_k$ may be determined according to the following pseudo code, which is for illustrative purposes only:

```
for(j=1; j ≤ k−1 ; j++)
    δ(j) = (β−1)*α(j)*β^[ l(k−1)−l(j) − 1];
end.
```

Applying the above pseudo code to the exemplary input values, δ is determined to be the list of values [16, 10, 15].

Next, in one embodiment, the present invention chooses the r smallest elements in the set (19), described as (20) and (21):

$l_{ji}$ such that with $l_{ji} \in \{1,2,\ldots,k-1\}$, $$\delta_{ji}(l_{k-1}-l_{ji}) \leq \delta_{ji+1}(l_{k-1}-l_{ji+1}), \quad (20)$$

$$J=\{j_1,j_2,\ldots,j_r\}. \quad (21)$$

If r=0, J is empty.

In one embodiment of the present invention, the r smallest elements of the set in (19) can be determined by sorting the set of $\delta_i$ elements in ascending order. This step can be represented by the pseudo code below, where the set in (19) is sorted and the result is placed in list Y, with the indices of the sorted elements placed in the list I. One skilled in the art will recognize that a list of elements can be sorted using various sorting algorithms, such as quick sort.

[Y, I]=sort([δ(1),δ(2),δ(3), . . . , δ(k−1)]).

As a result of the above steps being applied to the example input data of one embodiment, the following lists are generated:

Y=[10,15,16]

I=[2,3,1].

The next step of the algorithm of the present invention involves assigning a number of bits $b_i$ for i in the set $\{1, 2, \ldots, k-1\}$. This corresponds in one embodiment of the present invention to equation (22), where a number of bits is assigned to $b_i$ according to the following relationship:

$$b_i = \begin{cases} l_{k-1} - l_i + q + 1, & \text{when } i \in J \\ l_{k-1} - l_i + q, & \text{else} \end{cases}$$

The number of bits $b_i$ can be determined for i in the set $\{1, 2, \ldots, k-1\}$ as a function of the second list l by using the following pseudo code, which assigns a number of bits to $b_i$ using a for loop as understood by one of skill in the art, and which is for illustrative purposes only:

```
for (j = 1; j ≤ k−1 ; j++)
    b(j) = 1(k−1)−1(j)+q;
end.
```

Application of above pseudo code yields the set of bits:

b=[5,1,0].

Next, in one embodiment of the present invention, some $b_i$ will be incremented by a number of bits determined by (20), (21), and (22), when i is in the set J. This step can be represented by the following pseudo code, which is for illustrative purposes only:

```
for (n =1;n ≤ r; n++)
    b(I(n))=b(I(n)) + 1;
end.
```

Applying the relation in (22), for example, by the pseudo code above, where r=1, indicates that only $b(I_1)$ will be updated, to yield:

b=[5,2,0].

In this embodiment, we see that for α, the set of input characteristics, we have the associated number of bits $b_i$ assigned to the sub-channel associated with each $\alpha_i$:

α=[1,10,30]

b=[5,2,0].

The algorithm of the present invention has now, as shown above, determined the optimal number of bits $b_i$ to assign to the sub-channel associated with the sub-channel characteristic $\alpha_i$, given N sub-channels and B total bits to assign among the sub-channels, in a time O(N log N), which has shown to be independent of the total number of bits, B.

As a final step, not necessary for the algorithm of the present invention, and only performed for convenience, the number of bits $b_i$ associated with sub-channel characteristic $\alpha_i$ can now be associated back with the originating sub-channel $z_i$, as a function of the list I, using the following pseudo code, which is only for illustrative purposes:

```
for (n = 1; n ≤ N; n++)
    Z( I_n ) = b_n;
end.
```

Application of the above pseudo code to $b_i$ yields the following results:

z=[2,5,0].

Therefore, the first input sub-channel is assigned 2 bits, the second sub-channel 5 bits, and the third sub-channel 0 bits, in time O(N log N), and independent of the total number of bits, B.

Figure 10:
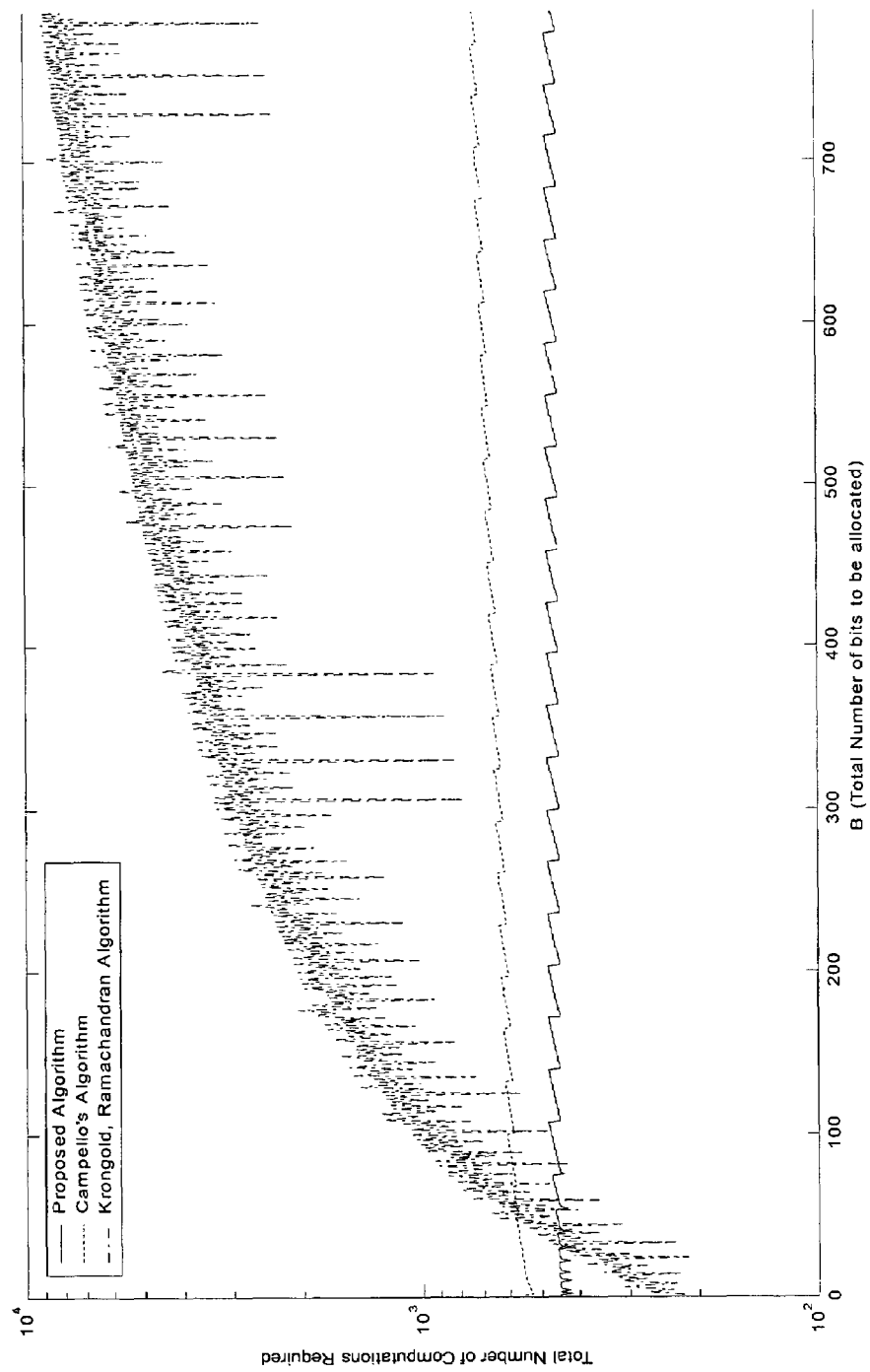
FIG. 10 illustrates the algorithm of the present invention where N=32 in comparison to prior art algorithms.
Figure 11:
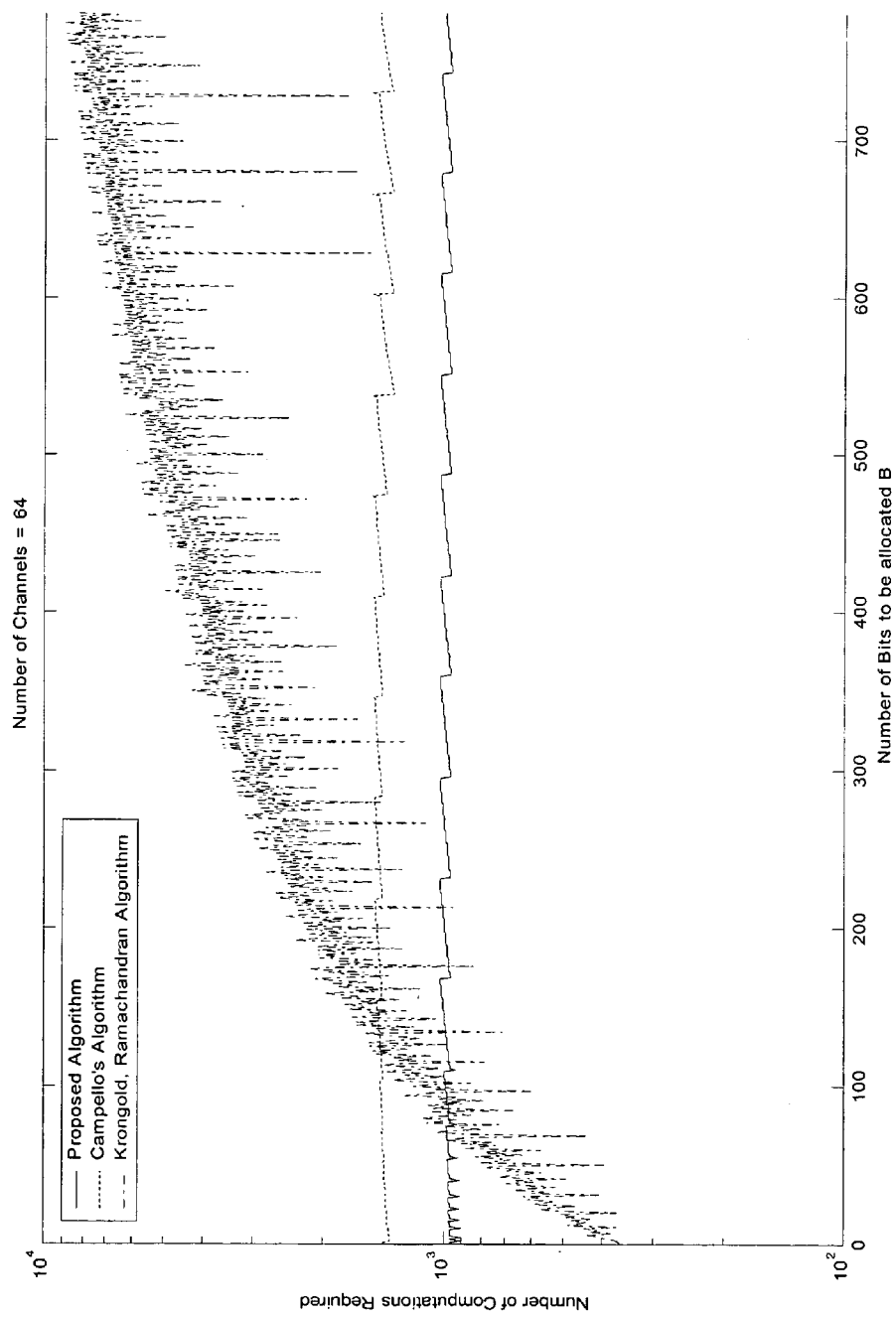
FIG. 11 illustrates the algorithm of the present invention where N=64 in comparison to prior art algorithms.

In view of the new optimal bit loading algorithm of the present invention, comparisons with prior art bit loading algorithms is illustrative to show advantages over the prior art. A comparison of the performance of the algorithms of Campello and Krongold, Ramchandran, and the algorithm of the present invention is shown in FIG. 10 and FIG. 11. In the drawings of FIG. 10 and FIG. 11, the number of computations needed for each algorithm to converge to the optimal solution was calculated by assuming that addition, subtraction, div, mod, multiplication or division of two numbers would need one computation as would the logical comparisons between two decimal numbers.

In FIG. 10, the bit loading algorithm of the present invention is compared to the referenced prior art algorithms for the case where the N number of sub-channels is 32. In FIG. 11, the same algorithms are compared for the case when N is 64. As can be seen from the graphs in FIG. 10 and FIG. 11, the bit loading algorithm of the present invention can allocate B bits among N sub-channels in time O(N log N), which provides a superior result when compared to the prior art.

The present invention has been illustrated in relation to embodiments which are intended in all respects to be illustrative rather than restrictive. Those skilled in the art will realize that the present invention is capable of many modifications and variations without departing from the scope of the invention.

We claim:

1. A method for determining a number of bits to assign to a frequency range with characteristic $\alpha_i$ in a signal with B total bits to be allocated among a plurality of frequency ranges, the method comprising the steps of:
   a. ordering a first list of frequency range characteristics containing the characteristic $\alpha_i$;
   b. creating a second list 1 with an entry $l_i$ associated with the frequency range with characteristic $\alpha_i$, wherein the entry $l_i$ is a function of the entries in the first list $\alpha$;
   c. determining a value k as a function of values in the second list and B; and
   d. assigning the number of bits determined by a function of k to the frequency range with characteristic $\alpha_i$, wherein the frequency range represents a sub-channel of a multi-carrier communication system.

2. The method of claim 1, wherein the ordering a first list step comprises the steps of:
   a. comparing a value $\beta$ to the number 1;
   b. if $\beta$ is greater than one, ordering the first list in ascending order; and
   c. if $\beta$ is less than one, ordering the first list in descending order.

3. The method of claim 1, wherein the second list 1 creating step further comprises the steps of:
   a. dividing frequency range characteristic $\alpha_i$ by $\alpha_1$;
   b. computing a logarithm of the division;
   c. calculating a ceiling function of the computed logarithm; and
   d. assigning the result of the calculated ceiling function to $l_i$.

4. The method of claim 1, wherein determining a value k comprises the step of determining a smallest value k, such that the sum from 1 through k−1 of $(l_k-l_i)$ is greater than or equal to B.

5. The method of claim 1, wherein determining a value k comprises the steps of:
   a. creating a list R;
   b. assigning values to entries in R such that the $k^{th}$ entry in R is the sum from 1 to k−1 of $(l_k-l_i)$; and
   c. determining the smallest value k such that $R_k$ is greater than or equal to B.

6. The method of claim 5, further comprising the steps of:
   a. calculating a value d as the difference between B and $R_{k-1}$;
   b. calculating a value r as the remainder when d is divided by k−1; and
   c. calculating a value q as d divided by k−1.

7. The method of claim 6, wherein the step of assigning bits to the frequency range associated with $\alpha_i$ comprises the steps of:
   a. calculating a value g as $l_{k-1}-l_i+q$;
   b. if the index i of $\alpha_i$ is less than or equal to r, incrementing g by one;
   c. if i is less than k, assigning the frequency range associated with $\alpha_i$ g bits; and
   d. if i is greater than or equal to k, assigning the frequency range associated with $\alpha_i$ zero bits.

8. A system for determining a number of bits to assign to a frequency range with characteristic $\alpha_i$ in a signal with B total bits to be allocated among a plurality of frequency ranges, the system comprising:
   a. means for ordering a first list of frequency range characteristics containing the characteristic $\alpha_i$;
   b. means for creating a second list 1 with an entry $l_i$ associated with the frequency range with characteristic $\alpha_i$, wherein the entry $l_i$ is a function of the entries in the first list $\alpha$;
   c. means for determining a value k as a function of values in the second list and B; and
   d. means for assigning the number of bits determined by a function of k to the frequency range with characteristic $\alpha_i$, wherein the frequency range represents a sub-band of a digital multimedia compression system.

9. The system of claim 8, wherein the means for ordering a first list comprises:
   a. means for comparing a value $\beta$ to the number 1;
   b. means for ordering a first list in ascending order, if $\beta$ is greater than one; and
   c. means for ordering a first list in descending order, if $\beta$ is less than one.

10. The system of claim 8, wherein the means for creating a second list 1 further comprises:
   a. means for dividing frequency range characteristic $\alpha_i$ by $\alpha_1$;
   b. means for computing a logarithm of the division;
   c. means for calculating a ceiling function of the computed logarithm; and
   d. means for assigning the result of the calculated ceiling function to $l_i$.

11. The system of claim 8, wherein the means for determining a value k comprises a means for determining a smallest value k, such that the sum from 1 through k−1 of $(l_k-l_i)$ is greater than or equal to B.

12. The system of claim 8, wherein the means for determining a value k comprises:
   a. means for creating a list R;
   b. means for assigning values to entries in R such that the $k^{th}$ entry in R is the sum from 1 to k−1 of $(l_k-l_i)$; and
   c. means for determining the smallest value k such that $R_k$ is greater than or equal to B.

13. The system of claim 12, further comprising:
   a. means for calculating a value d as the difference between B and $R_{k-1}$;
   b. means for calculating a value r as the remainder when d is divided by k−1; and
   c. means for calculating a value q as d divided by k−1.

14. The system of claim 13, wherein the means for assigning bits to the frequency Range associated with $\alpha_i$ comprises:
   a. means for calculating a value g as $l_{k-1}-l_i+q$;
   b. means for incrementing g by one, if the index i of $\alpha_i$ is less than or equal to r;
   c. means for assigning the frequency range associated with $\alpha_i$ g bits, if i is less than k; and
   d. means for assigning the frequency range associated with $\alpha_i$ zero bits, if i is greater than or equal to k.

15. A computer program product embodied in a computer-readable medium for determining a number of bits to assign to a frequency range with characteristic $\alpha_i$ in a signal with B total bits to be allocated among a plurality of frequency ranges, wherein the computer program product is encoded to perform the steps of:
   a. ordering a first list of frequency range characteristics containing the characteristic $\alpha_i$;
   b. creating a second list 1 with an entry $l_i$ associated with the frequency range with characteristic $\alpha_i$, wherein the entry $l_i$ is a function of the entries in the first list $\alpha$;
   c. determining a value k as a function of values in the second list and B; and
   d. assigning the number of bits determined by a function of k to the frequency range with characteristic $\alpha_i$, wherein the frequency range represents a sub-channel of a multi-carrier communication system.

16. The computer program product according to claim 15, wherein the second list 1 creating step further comprises the steps of:
 a. dividing frequency range characteristic $\alpha_i$ by $\alpha_1$;
 b. computing a logarithm of the division;
 c. calculating a ceiling function of the computed logarithm; and
 d. assigning the result of the calculated ceiling function to $l_i$.

17. The computer program product according to claim 15, wherein determining a value k comprises the step of determining a smallest value k, such that the sum from 1 through k−1 of $(l_k-l_i)$ is greater than or equal to B.

18. The computer program product according to claim 15, wherein determining a value k comprises the steps of:
 a. creating a list R;
 b. assigning values to entries in R such that the $k^{th}$ entry in R is the sum from 1 to k−1 of $(l_k-l_i)$; and
 c. determining the smallest value k such that $R_k$ is greater than or equal to B.

19. The computer program product according to claim 18, further comprising the steps of:
 a. calculating a value d as the difference between B and $R_{k-1}$;
 b. calculating a value r as the remainder when d is divided by k−1; and
 c. calculating a value q as d divided by k−1.

20. The computer program product according to claim 19, wherein the step of assigning bits to the frequency range associated with as comprises the steps of:
 a. calculating a value g as $l_{k-1}-l_i+q$;
 b. if the index i of $\alpha_i$ is less than or equal to r, incrementing g by one;
 c. if i is less than k, assigning the frequency range associated with $\alpha_i$ g bits; and
 d. if i is greater than or equal to k, assigning the frequency range associated with $\alpha_i$ zero bits.

* * * * *

UNITED STATES PATENT AND TRADEMARK OFFICE
CERTIFICATE OF CORRECTION

PATENT NO. : 7,539,254 B2  Page 1 of 1
APPLICATION NO. : 11/127529
DATED : May 26, 2009
INVENTOR(S) : Dasgupta et al.

It is certified that error appears in the above-identified patent and that said Letters Patent is hereby corrected as shown below:

In column 1, line 4, insert the following before "Cross Reference to Related Application":

--GOVERNMENT SUPPORT CLAUSE
This invention was made with government support under Grant DAAD190010534 awarded by the Department of the Army, Grant ECS-0225432, awarded by the National Science Foundation, Grant CCR-9973133 awarded by the National Science Foundation, and Grant ECS-9970105 awarded by the National Science Foundation. The government has certain rights in the invention.--

Signed and Sealed this

Twenty-eighth Day of July, 2009

JOHN DOLL
*Acting Director of the United States Patent and Trademark Office*